United States Patent [19]

Beale

[11] Patent Number: 4,687,679

[45] Date of Patent: Aug. 18, 1987

[54] METHOD OF COATING A SUBSTRATE

[75] Inventor: Harry A. Beale, Columbus, Ohio

[73] Assignee: Applied Coatings International, Inc., Columbus, Ohio

[21] Appl. No.: 778,465

[22] Filed: Sep. 20, 1985

Related U.S. Application Data

[62] Division of Ser. No. 481,140, Apr. 1, 1983.

[51] Int. Cl.$^4$ .............................................. B05D 3/06
[52] U.S. Cl. ....................................... 427/38; 427/39; 427/41
[58] Field of Search ..................................... 427/38–41

Primary Examiner—Bernard D. Pianalto
Attorney, Agent, or Firm—John L. Gray

[57] ABSTRACT

A monomer which would normally be clear and transparent upon polymerization is co-deposited with silver halide particles of extremely small particle size onto transparent glass or plastic by plasma polymerization or glow discharge polymerization. The resultant coated glass or plastic material will exhibit photochromic behavior and may be used in the manufacture of eyeglasses, architectural glass, or glass for automobile windows or windshields.

4 Claims, No Drawings

METHOD OF COATING A SUBSTRATE

This application is a division of application Ser. No. 481,140, filed Apr. 1, 1983.

BACKGROUND OF THE INVENTION

Reversible photochromic materials have found application primarily in eyeglasses and these are made of glass containing silver halide particles with small additions of copper for improving the sensitivity of the system.

The main objection to eyeglasses made in this fashion is that they are heavier than plastic eyeglasses and need to be individually tested in accordance with standard safety tests prior to sale. Because of cost, such photochromic glass has not found widespread application as architectural glass or as automobile window glass.

SUMMARY OF THE INVENTION

The instant invention involves co-depositing a monomer which would normally be clear and transparent upon polymerization with silver halide particles of extremely small particle size. Some of the monomers that are satisfactory are hexamethyldisiloxane (HMDO), hexamethyldisilixane (HMDS), vinyl trimethylsilane (VTMS), tetramethyldisiloxane, and vinyl trimethoxysilane. These monomers when polymerized are also scratch resistant. In addition, the following materials are identified in the open literature as monomers which when used to prepare polymers by plasma polymerization remain clear and transparent: Toluene, Xylene, Benzene, Cyclohexane, Hexane, Chlorobenzene, Dimethylpolysiloxane, Triethylsilane, 1-Chloropropene, 1-Chloro-z-methylpropane Butanol-1, Cyclohexene, Heptene-2, Styrene, 2-Naptanane, Proprionaldehyde, Vinyltrimethylsilane, Veleronitrile, 2,5-Dimethyl-2,4-Hexadiene, and Acetonitrile. Another material that meets the criteria of being clear and transparent upon polymerization is aceto-nitrile, which is not as scratch resistant. The particle size chosen is less than the wave length of light and preferably the particles are from 25–150 angstrom (Å) in diameter and is controlled by the relative deposition rates of the silver halide particles. While various silver halides may be used, silver chloride is the preferred material and HMDO and HMDS are preferred monomers. Various sensitizers may be used with the silver halides such as copper. The preferred co-deposition process is plasma polymerization and the transparent glass or plastic substrates upon coating have use as eyeglasses, architectural glass, and automobile window glass.

It is therefore an object of this invention to provide a coating material and its method of manufacture which exhibits reversible photochromic characteristics.

It is a further object of this invention to provide a method of depositing said material on a transparent substrate, either glass or plastic.

It is a still further object of this invention to provide such a coated substrate which may be fabricated into an eyeglass, architectural glass, or automobile window glass.

Additional objectives and advantages of the present invention will become more readily apparent to those skilled in the art when the following general statements and descriptions are considered.

DETAILED DESCRIPTION OF THE INVENTION

This invention involves the discovery that when silver halide particles are entrained in a monomer which would normally be clear and transparent upon polymerization as a result of co-depositing the monomer and the silver halide particles on a substrate, the resultant product will exhibit photochromic properties and will darken appreciably and will restrict the amount of visible light when the resultant product is exposed to light. When the light source is reduced, the resultant product will lighten permitting the increased transmission of visible light therethrough.

Silver halide in the particle size of 25 Å to 150 Å is preferred and the silver halide must be of a size smaller than the wave length of light. The silver halide is dispersed in the polymer and the amount dispersed is 0.1–1.5 parts for 99.9–98.5 parts of polymer. The size of the particles and the interparticle spacing are controlled by the relative deposition rates.

The preferred deposition process is plasma polymerization which is sometimes referred to as glow discharge polymerization. This is defined as the vapor phase reaction of low molecular weight organic materials as the result of electron bombardment, ultraviolet radiation, or electrical discharges to produce thin polymeric coatings on metallic or nonmetallic substrates. The polymerization takes place in a partial vacuum, typically between 10 and $10^{-2}$ Pa ($10^{-1}$ and $10^{-4}$ torr). The substrate may merely be immersed in the plasma and need not exhibit surface conduction but rather can be allowed to float electrically relative to the plasma potential. This enables the coating of unusually shaped substrates, large numbers of small substrates, or very large substrates. The silver halide is supplied to the region where the substrate is located, typically utilizing the evaporation process.

The thus coated substrates may be used for eyeglasses, architectural glass, and automobile window and windshield glass.

While this invention has been described in its preferred embodiment, it is to be appreciated variations therefrom may be made without departing from the true scope and spirit of the invention.

What is claimed is:

1. The method of coating a substrate which comprises combining a vapor of a monomer which upon polymerization would otherwise be clear and transparent with a vapor of silver halide in a partial vacuum to effect plasma polymerization of said monomer and codepositing said silver halide and said plasma-formed polymer on a substrate immersed in said plasma at a rate so that silver halide molecules so deposited from the silver halide vapor will form particles dispersed throughout said polymer of a size smaller than the wave length of white light.

2. The method of claim 1 wherein the coating material includes silver halide of a particle size of from 25 Å to 150 Å.

3. The method of claim 1 wherein the coating material contains 0.05 percent to 1.5 percent by weight of silver halide.

4. The method of claim 3 wherein the silver halide in the coating material is present in a particle size of 25 Å to 150 Å.

* * * * *